United States Patent [19]

Morith

[11] 4,336,746
[45] Jun. 29, 1982

[54] SELF RETRACTING PISTON APPLICABLE FOR DISK BRAKE ASSEMBLIES

[76] Inventor: Franklin J. Morith, 2112 Lee Ave., South El Monte, Calif. 91733

[21] Appl. No.: 209,049

[22] Filed: Nov. 21, 1980

[51] Int. Cl.³ .......................... F01B 31/00; F16J 15/18
[52] U.S. Cl. ............................... 92/130 B; 92/130 D; 92/168; 188/71.8
[58] Field of Search ................. 92/130 B, 130 R, 168, 92/130 C, 130 D; 188/71.8, 196, 72.3; 192/111 A

[56] References Cited

U.S. PATENT DOCUMENTS

| 3,186,521 | 6/1965 | Chouings | 188/71.8 |
| 4,058,084 | 11/1977 | Kawaguchi et al. | 188/71.8 |
| 4,156,532 | 5/1979 | Kawaguchi et al. | 92/130 B |
| 4,228,726 | 10/1980 | Rinker et al. | 92/168 |

FOREIGN PATENT DOCUMENTS 1512778  6/1978  United Kingdom ............. 92/130 B

Primary Examiner—Paul E. Maslousky
Attorney, Agent, or Firm—Howard J. Johnson

[57] ABSTRACT

Actuating piston of disk brake is provided with self-retracting 3-element control unit carried, typically, in surrounding annular piston recess with one element in frictional or tensioned registration with wall of piston chamber. Elements are (a) radially tensioned anchorage ring which frictionally abuts chamber wall at piston-extension position, (b) axially compressible/resilient co-axial ring such as elastomeric O-ring, compression spring, or corrugated metallic washer which is compressed by piston extension, (c) positioning and limit bracket which locates a and b and provides axial channel for reciprocation of piston in response to fluid pressure from brake pedal. Upon relief of fluid pressure, expansion of compressed co-axial ring b "lifts" piston to retracted position. Unit may be installed as original equipment on vehicles, etc. or existing piston assemblies may be modified to incorporate such.

6 Claims, 16 Drawing Figures

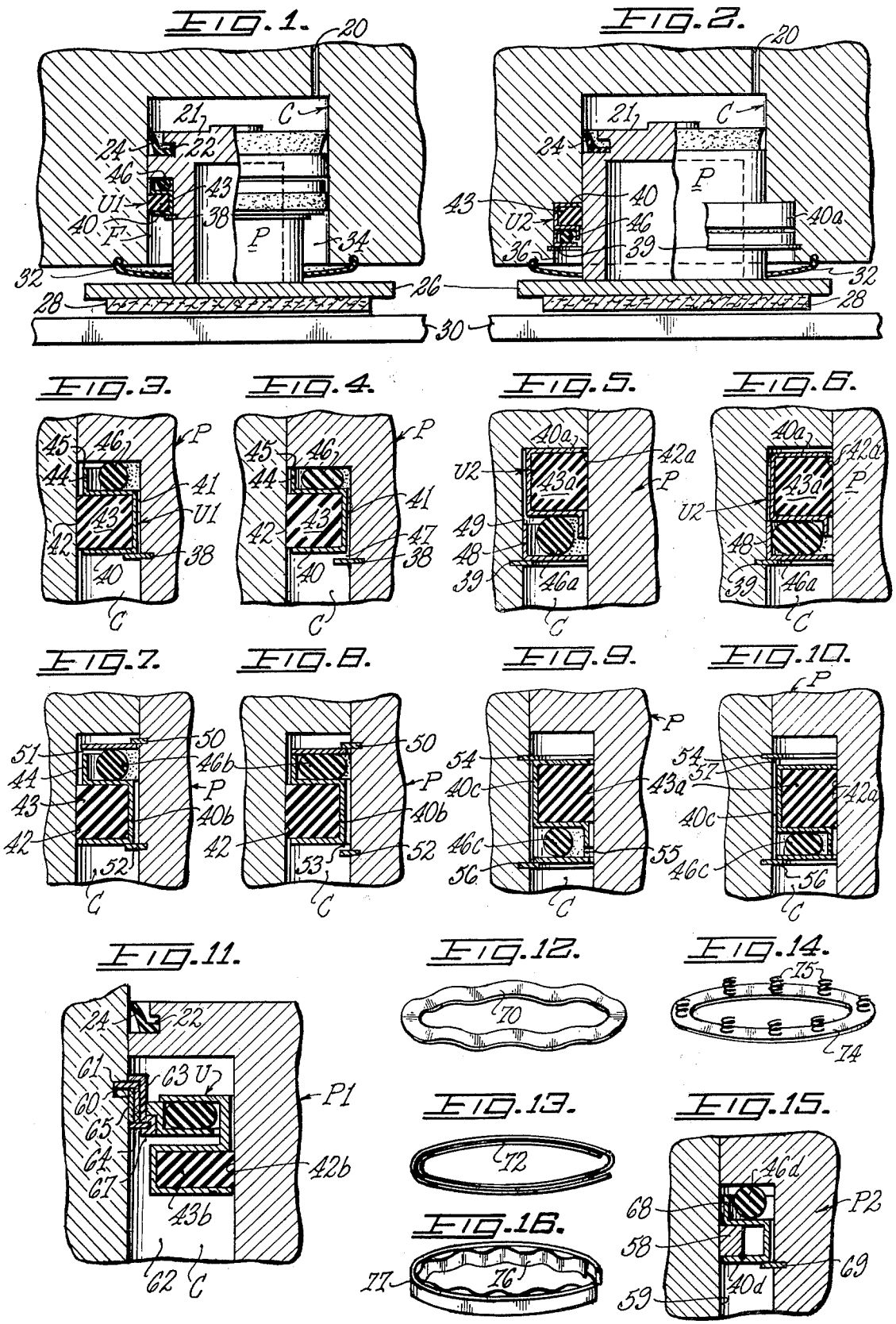

SELF RETRACTING PISTON APPLICABLE FOR DISK BRAKE ASSEMBLIES

BACKGROUND

It is too frequently observed that disk brakes of automobiles or other mechanical installations, upon brake pedal release, disengage or retract from a braking position without complete clearance of contact. The result is that the brake pad remains in a loose "scraping" position, which drag continuously increases the needless consumption of fuel or energy. This condition is sometimes attributed to the aging of O-ring seals of the brake piston assembly, plus corrosion of contacting metal which may freeze the piston seal. However study will show that there is really no reliable structure provided in current brake assemblies which will positively and completely retract the operating piston after each release of fluid pressure.

It seems to be expected that since the brake fluid is in a closed hydraulic system, the relief of fluid pressure will automatically move the piston back. However, too often this is not the situation. Accordingly it is an object now to provide such a positive action, self-aligning piston retraction construction which can be installed as original equipment on various mechanisms, particularly on brakes of motor vehicles, or which can be fitted as a reconstruction unit in presently unsatisfactory brake assemblies. This can be done with a minimum of modification, specifically by reducing the piston circumference to provide a retaining recess for the control unit which is then attached to the surrounding slot which previously held a ring seal.

SUMMARY

Briefly, there is provided a 3-element control unit which is installed along the circumferential interface formed between a piston chamber and its contained piston. The retraction control unit is held together by a positioning, annular channel-type bracket which surrounds the piston coaxially and is associated with axial stop or limit means for setting a predetermined amount of axial compression which occurs with each piston extension, to a compression/expansion ring which the bracket carries. A second ring carried by the bracket, coaxially, is radially tensioned and disposed to frictionally engage, either the piston or the piston-chamber wall so as to anchor the bracket during a piston extension -first-ring-compression move, so that from such position the first ring expansion can retract the piston. Such carrying bracket also provides an axial slideway or passage, either for the piston or for the piston plus its carried control unit. This depends on which structure the friction ring engages; if it engages the chamber wall, the axial passage of the bracket receives only the piston; if the friction ring grips the piston itself, the axial slideway is then peripheral to the carried control unit, that is, adjacent the piston chamber wall.

The control unit comprising the positioning bracket with its two coaxial rings is disposed either in an annular recess formed in the piston chamber, or else formed in the piston itself. In either position, the unit may be carried either by the piston or by the piston chamber. The first, or axially compressible ring may be an elastomeric O-ring (e.g. teflon), or a corrugated metallic ring (FIG. 12), or a spiral or coil ring (FIG. 13), or an annular series of individual spring coils (FIG. 14). The second or radially tensioned ring may be elastomeric material (which can grip either the piston or the chamber wall), or a radially-outward tensioned split-ring spring (which will engage only the piston chamber wall), FIGS. 15–16.

Conveniently the bracket holds the pair of rings axially adjacent, but it may be in two pieces so as to space them apart axially as in FIG. 11. The control unit is initially located along the piston-chamber interface by extension of the piston to its fully functional position; at such position the friction ring "locks-on" to the chamber wall or piston as the case may be. In time, as the brake pad becomes worn, such slack may be taken up by the additional piston extension progressively moving the anchorage position axially a corresponding amount. Abutment pins or rings can also be placed along the interface to limit the reciprocable play of the moving assembly. Also, configuration or stop means of the bracket sets a limit of compression of the first ring so that it retains sufficient resiliency to retract the piston.

Alternate to resilient metal, each of the co-axial rings may be of elastomeric material, i.e. the large class of elastic substances ranging from rubber to polymerized resins ("plastics"). A commerically available example of the latter is "teflon" TM [polytetrafluoroethylene and fluorinated ethylene-propylene] thermoplastic resin which combines chemical and thermal inertness with anti-stick, resilience and sealant ability.

It will be appreciated also, that the here illustrated pistons are shown vertically only for greater clarity, but in practice they may be disposed more-or-less horizontal.

BRIEF DESCRIPTION OF THE DRAWINGS

FIG. 1 is a sectional view, with a portion in elevation, of the operating piston and chamber of a vehicle brake, with the present control unit carried by the piston.

FIG. 2 is a similar view but with the structure of the control unit mounted in an annular recess of the piston chamber.

FIG. 3 is an enlarged detail of the piston-carried unit of FIG. 1 shown in release position, and FIG. 4 is the same at the end of a down-stroke of the piston.

FIGS. 5 and 6 are similar detail views of the form of FIG. 2 with the control unit in brake relief and applied positions respectively.

FIGS. 7 and 8 are sectional views of the control unit which is carried by the piston between a pair of stop-rings but occupies a peripheral recess of the chamber.

FIGS. 9 and 10 are similar views wherein the control unit is disposed between an axially separated pair of stop rings of the chamber wall and projects into a circumferentially reduced area of the piston.

FIG. 11 is a partial sectional view of a conventional brake-operating piston and chamber which have been modified by reducing the piston circumference so as to receive the piston control unit which is carried by a composite frame anchored in the slot of the chamber wall which previously held a ring seal.

FIG. 12 is a perspective view of a corrugated wave washer which may be used in place of the compressible O-ring of FIGS. 1–11,15.

FIG. 13 is a perspective view of a segment of a helical spring which may be substituted for the compressible O-ring.

FIG. 14 is a perspective view of an annular plate carrying individual coil springs, which unit may be substituted for the compressible O-ring.

FIG. 15 is a partial transverse section of a recessed piston and chamber wherein the control unit bracket carries an outwardly biased, split friction ring, and FIG. 16 is a perspective view of an outer, split ring which is radially tensioned by a split expander ring.

DETAILED DESCRIPTION OF PREFERRED EMBODIMENTS

As seen in FIGS. 1, 2 and 11, a cylindrical piston P is disposed in a piston chamber C which is connected by a conduit 20 to a conventional source of pressurized liquid or fluid (not shown). The head 21 of the piston may be reduced to form a seating groove 22 for a lip seal 24 to prevent out-leakage of fluid. The distal end of the piston is joined to a brake pad holder 26 which carries a brake pad 28 disposed to frictionally engage a disk rotor 30 when pressed thereagainst by the piston. An annular dust seal 32 of conventional type may span the distal end of the interface F which separates the piston and chamber.

The present control unit U1 or U2 is shown mounted in a peripheral recess 34 of the piston in FIG. 1 and in a peripheral recess 36 of the chamber in FIG. 2. This difference affects the positioning of the holding bracket and its diverse pair of carried annular rings, as well as location of an anchorage (snap) ring which ring 38 is carried by the piston in FIG. 1 and (ring 39) by the chamber wall in FIG. 2.

The positioning bracket of FIGS. 1, 3, 4 is formed by a rectangular, three-sided channel segment 40 which holds a friction ring 43 with its gripping face 42 projecting radially from the open portion of the bracket channel so as to clingingly engage the wall of the chamber C. An annular arm 44 of the bracket is upstanding from the upper, outer edge of the channel segment 40 and is spaced radially inward by a small clearance from the chamber wall C. Within the annular space thus defined inward from the annulus 44 is a compressible O-ring 46 which in the relief or non-compressed position of the piston (FIG. 3) extends upward beyond the level of the abutment edge 45 of the arm so as normally to provide an open gap above the edge, which gap thus measures the possible extent of piston travel or displacement (as long as the friction ring remains fixed). The edge 45 thus serves as a stop means. This amount of "pre-set" piston displacement can be further reduced simply by adding one or more snap rings for a desired (total) thickness adjacent the snap ring 38, (39, 52, 56). This will of course similarly decrease the inner gap 47 (FIG. 4) which gap is a measure of the "retraction" distance which expansion of the elastomeric O-ring 46 will "lift" the piston from its extended position. It will be seen also, that in this arrangement, the inner face of the annular wall 41 serves as a slide channel for the moving piston, while the bracket itself remains fixed, due to the attachment face 42 of the friction ring which is thus parallel to the channel wall 41.

In the constructions of FIGS. 5-6, the control unit U2 being located in a peripheral recess of the piston chamber C, the friction ring 43a is attached to the unreduced piston wall and its containing channel segment 40a is movable along the recess by movement of the piston; the lower bracket segment 48 which holds the compressive O-ring 46a remains fixed as positioned by the snap ring 39. The length of possible piston displacement is that measured by the gap 49.

In the constructions of FIGS. 7-8 and FIGS. 9-10, the control units in both cases are located between a pair of anchorage rings 50, 52 carried in slots of the piston P, or the anchorage rings 54, 56 carried in slots of the chamber wall C. In the former case, the channel segment 40b is held fixed by the friction ring 43; in the latter case, it is similarly anchored to the piston. In either event, the maximum piston displacement is determined by the gaps 51, 53 (FIGS. 7-8) and gaps 55, 57 (FIGS. 9-10).

The construction of FIG. 11 shows how a conventional piston P1 which had only a ring seal (not shown) anchored in a slot 60 of the chamber wall, is transformed to the form illustrated which utilizes the present control unit. The piston P1 is first turned down to produce the peripheral recess 62 (which is thus prepared to hold the control unit) and an anchorage snap ring 61 is then inserted in the slot 60 which held the ring seal. A stepped, annular support frame 63 is then placed in right-angle engagement with the projecting ring 61 and is braced by an axially spaced snap ring 64 with axially directed spacer rings 65 lodged between the separated rings 61 and 64. Thus the frame 63 supports a control unit U, with the friction ring 43b pressed to the piston wall at the face 42b.

When the ring 43 is of radially compressed elastomeric material (held in a three sided channel 40, 40a), it can exert its gripping power in either direction, that is, against the piston P or chamber wall C depending upon which direction is faced by the open side of the channel. However one may also use a split ring which is radially outward biased or tensioned and such ring thus will be located to grip only the chamber and not the piston.

FIG. 15 illustrates use of such a split expansion spring 58 of the type used as compression rings on pistons of engines. The radially-outward biased spring 58 is held against the chamber wall 59 by frictional contact from its placement within the channel 40d of the annular bracket, the latter located in a recess of the piston P2 by an anchorage ring 69. Such split ring 58 is rigid in an axial dimension and of a sufficient radial thickness to prevent any distortion or bending which might occur with the elastomeric friction ring 43 adjacent its unbracketed edge, i.e. along the face 42 FIG. 7, 42b FIG. 11. The ledge 68 defines the compression limit of the O-ring 46d. As in the previous examples, the O-ring can be replaced by the corrugated metal ring 70 (FIG. 12), the coil spring 72 (FIG. 13), or the annular support plate 74 with its upstanding segments of coil springs 75 (FIG. 14).

Alternate to such split spring 58, there may also be used in the same bracket channel, the composite construction of FIG. 16 which consists of an inner "marcell" (corrugated) split spring 76 which is tensioned or biased radially outward against a flat-faced elastomeric (split) ring 77. The marcell ring also has the effect of keeping the radial channel or bracket walls (40d) perpendicular to the piston and chamber wall so that the bracket itself does not "tilt" or allow the moving piston to bind thereagainst. Such expander ring 76 can also be used with the automotive type compression ring 58, that is, for adding more tension to the latter.

The term "ring" as used in the claims includes a split ring or discontinuous ring segments.

I claim:

1. In combination, a first member comprising a piston, a second member comprising a wall circumferentially surrounding said piston and defining a piston chamber for receiving said piston, and means for applying and relieving operating pressure to the piston for its axial extension and retraction within the piston chamber:

a retraction control unit surrounding the piston and carried by one of said members disposed axially slidable relative to the other said member, said unit comprising a positioning bracket holding a pair of coaxial rings within a peripheral recess formed in one of said members along said interface, a first one of said rings being an axially compressible, resilient ring, and a second one being a radially tensioned anchorage ring formed with a pair of generally parallel, circumferential faces, radially spaced apart and surrounding said piston, one of said parallel faces being disposed surrounding said piston so as to define an axial slideway for reciprocable movement of the piston, and the other parallel face being radially tensioned so as to frictionally engage one of said members for anchorage of the control unit thereto, stop means disposed along said slideway adjacent said control unit and positioned to limit the axial compression of said first ring when effected by extension of the piston to an operating position, whereby upon release of operating pressure, resilient expansion of said first ring by the amount of its compression causes retraction of the piston by a corresponding amount.

2. The combination of claim 1 which forms an operative part of a disk brake assembly.

3. The combination of claim 1 wherein said first ring comprises an elastomeric O-ring.

4. The combination of claim 1 wherein said first ring comprises a corrugated metallic ring.

5. The combination of claim 1 wherein said first ring comprises a coil spring.

6. The combination of claim 1 wherein said second ring comprises elastomeric material.

* * * * *

UNITED STATES PATENT OFFICE
CERTIFICATE OF CORRECTION

Patent No. 4,336,746           Dated June 29, 1982

Inventor(s) Franklin J. Morith

It is certified that error appears in the above-identified patent and that said Letters Patent are hereby corrected as shown below:

Claim 1, column 5, line 8, "interface" should read

--circumferential wall--

Signed and Sealed this

Twelfth Day of October 1982

[SEAL]

Attest:

GERALD J. MOSSINGHOFF

Attesting Officer        Commissioner of Patents and Trademarks

UNITED STATES PATENT OFFICE
CERTIFICATE OF CORRECTION

Patent No. 4,336,746    Dated June 29, 1982

Inventor(s) Franklin J. Morith

It is certified that error appears in the above-identified patent and that said Letters Patent are hereby corrected as shown below:

At the beginning of column 1, insert -- This is a continuation of Ser. No. 118,413, filed February 4, 1980.--

Signed and Sealed this

Twenty-sixth Day of July 1983.

[SEAL]

Attest:

GERALD J. MOSSINGHOFF

Attesting Officer    Commissioner of Patents and Trademarks